Figure 1:
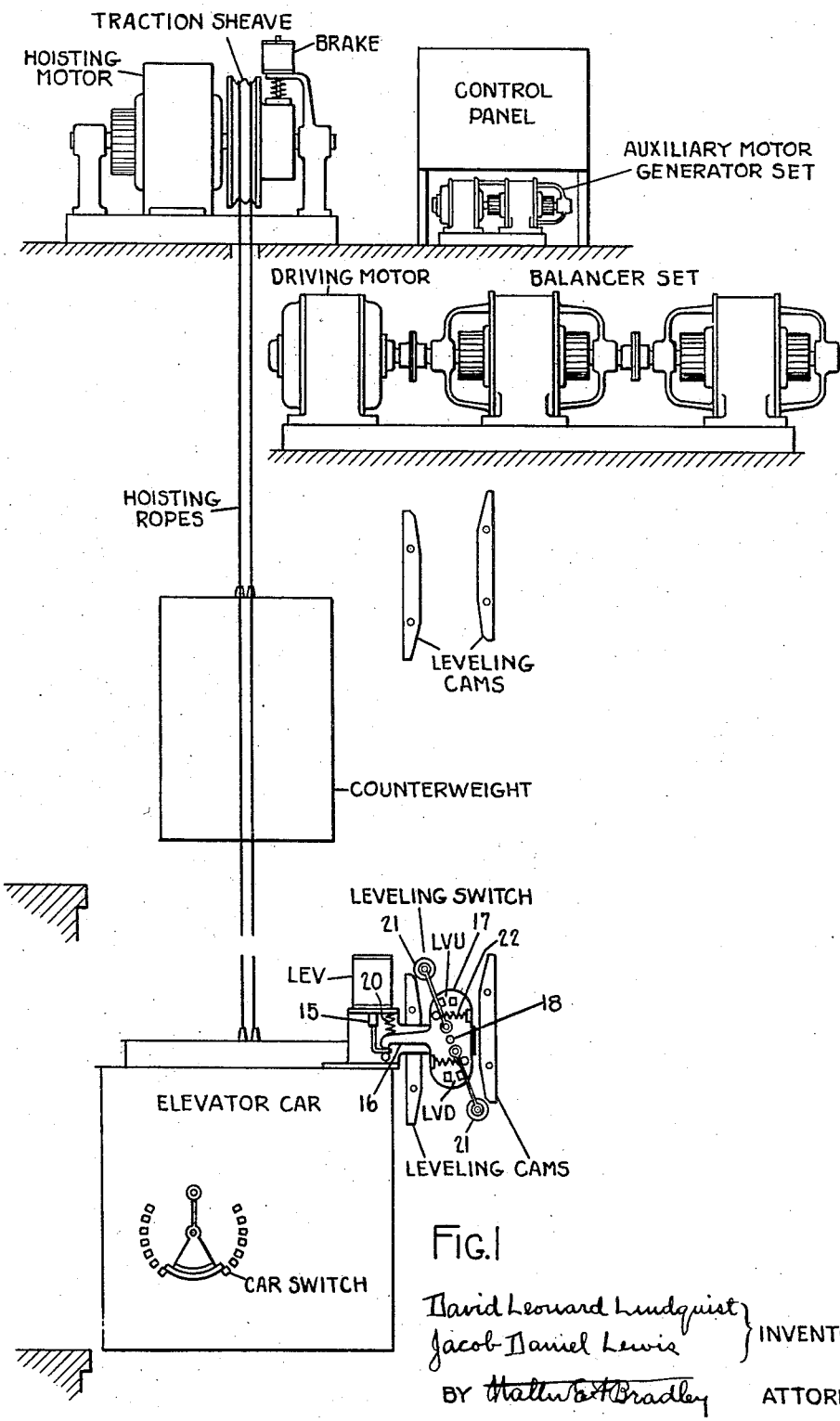

April 10, 1945.  D. L. LINDQUIST ET AL  2,373,579
MOTOR CONTROL SYSTEM
Filed May 8, 1943    5 Sheets-Sheet 3

David Leonard Lindquist
Jacob Daniel Lewis  INVENTORS
BY Walter E. Bradley   ATTORNEY Patented Apr. 10, 1945

2,373,579

UNITED STATES PATENT OFFICE 2,373,579

MOTOR CONTROL SYSTEM

David Leonard Lindquist, Hartsdale, and Jacob Daniel Lewis, Yonkers, N. Y., assignors to Otis Elevator Company, New York, N. Y., a corporation of New Jersey Application May 8, 1943, Serial No. 486,470

31 Claims. (Cl. 172—152)

The invention relates to control systems for direct current motors, especially for such motors used as hoisting motors for elevator cars.

There is advantage in certain types of elevator installations, especially those for a larger number of elevators, in utilizing a multi-voltage source of direct current of several fixed voltage steps for applying power to the elevator hoisting motors. Where the primary source of power is direct current, the various voltage steps are obtained by floating a corresponding number of direct current armatures, all mechanically connected and in series, across the line. Where the primary source of power is alternating current these armatures are driven by an alternating current motor. Usually two armatures are combined in one armature having two separate windings and two commutators. The invention is especially directed to elevator installations of this character.

The principal object of the invention is to provide a control system for a direct current motor supplied with direct current from multi-voltage supply lines, in which the voltage is changed gradually in transferring from one voltage to another.

While the invention is applicable generally to work motors supplied with direct current from a multi-voltage source, it will be described as applied to a hoisting motor for an elevator car. The invention as applied to elevators involves the utilization of an auxiliary generator connected in circuit with the elevator hoisting motor as its connections are changed from one voltage step to another, and controlling the voltage of the generator to gradually change the voltage applied to the motor as such change in connection is made. With levelling mechanism provided, this auxiliary generator is also utilized to apply voltage to the elevator hoisting motor for the levelling operation.

In carrying out the invention in accordance with the arrangement which will be described, an auxiliary generator is utilized having two armature windings with a common field winding, each armature winding being adapted to provide a voltage equal to half the difference in voltage between two adjacent steps. In starting the elevator car, with the elevator motor armature connected across one of the generator armature windings, the generator field is energized, gradually bringing the voltage applied to the elevator motor armature up to half the voltage of the first step. Thereupon the motor armature in series with the other generator armature winding is connected to the first step, with the polarity of the other generator armature winding such that its voltage opposes the voltage of the first step so that half the voltage of the first step is still applied to the motor armature. The first generator armature winding is then disconnected from the motor armature and the field winding of the generator is deenergized causing a decrease in the voltage of the other generator winding to gradually bring the voltage applied to the motor armature up to that of the first step. The generator field winding is then energized for opposite polarity of the other generator armature winding and the voltage applied to the motor armature is thus increased gradually half of the next step. Thereupon the motor armature in series with the first generator armature winding is connected to the second step, with the polarity of the first generator armature winding such that its voltage opposes the voltage of the second step, so that the voltage across the motor armature remains equal to that of the first step plus one-half the second step. The motor armature is thereafter disconnected from the first step. The generator field winding is then deenergized to gradually bring the voltage applied to the motor armature up to that of two steps. This is repeated for the other steps to gradually bring the voltage applied to the motor armature up to full value. For retardation, this operation is reversed to bring the motor armature down to a slow speed and, if levelling mechanism is provided, voltage is applied to the motor armature by one generator armature winding for the levelling operation.

Features and advantages of the invention will be apparent from the following description and appended claims.

Figure 2:
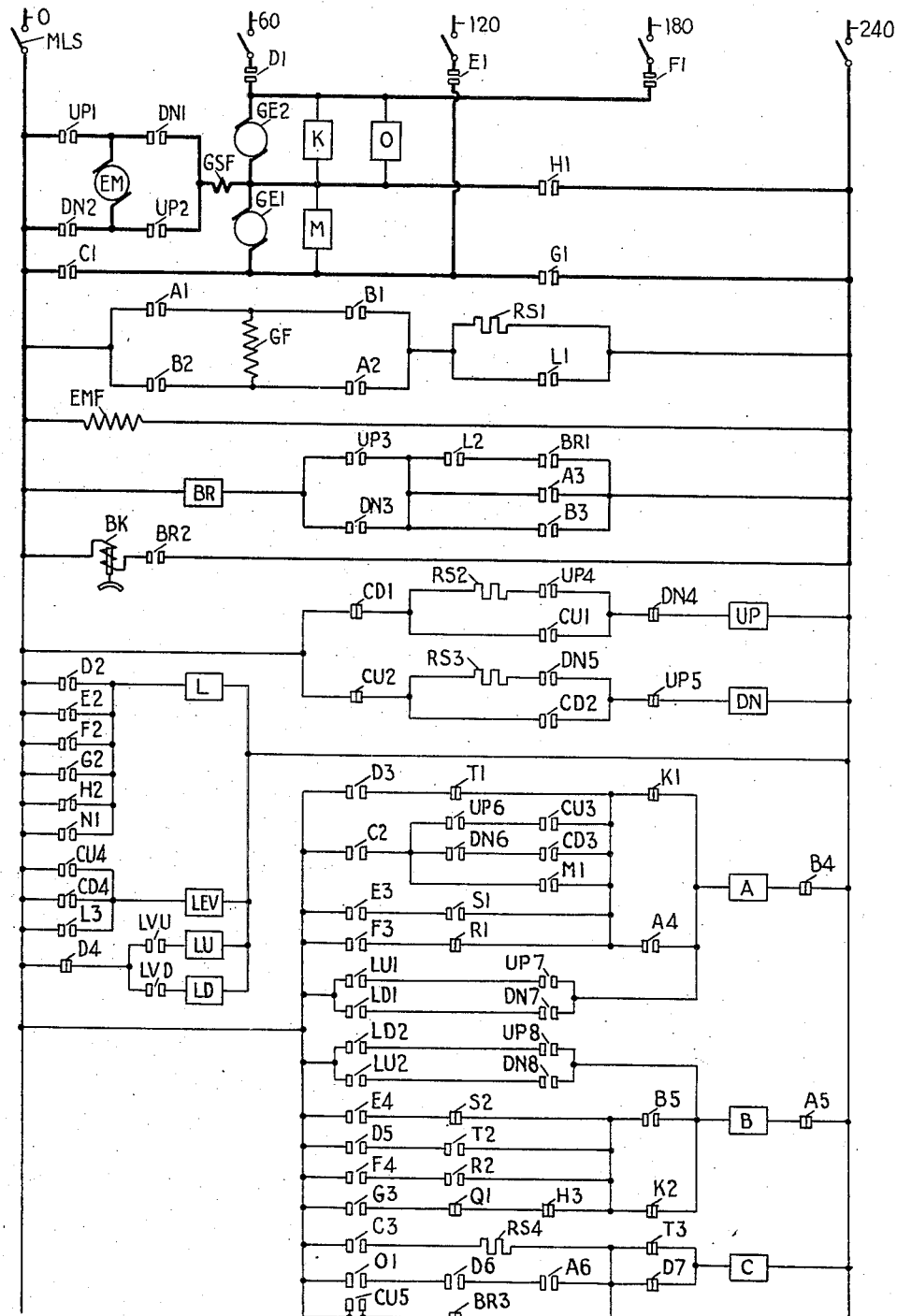
Figure 2S:
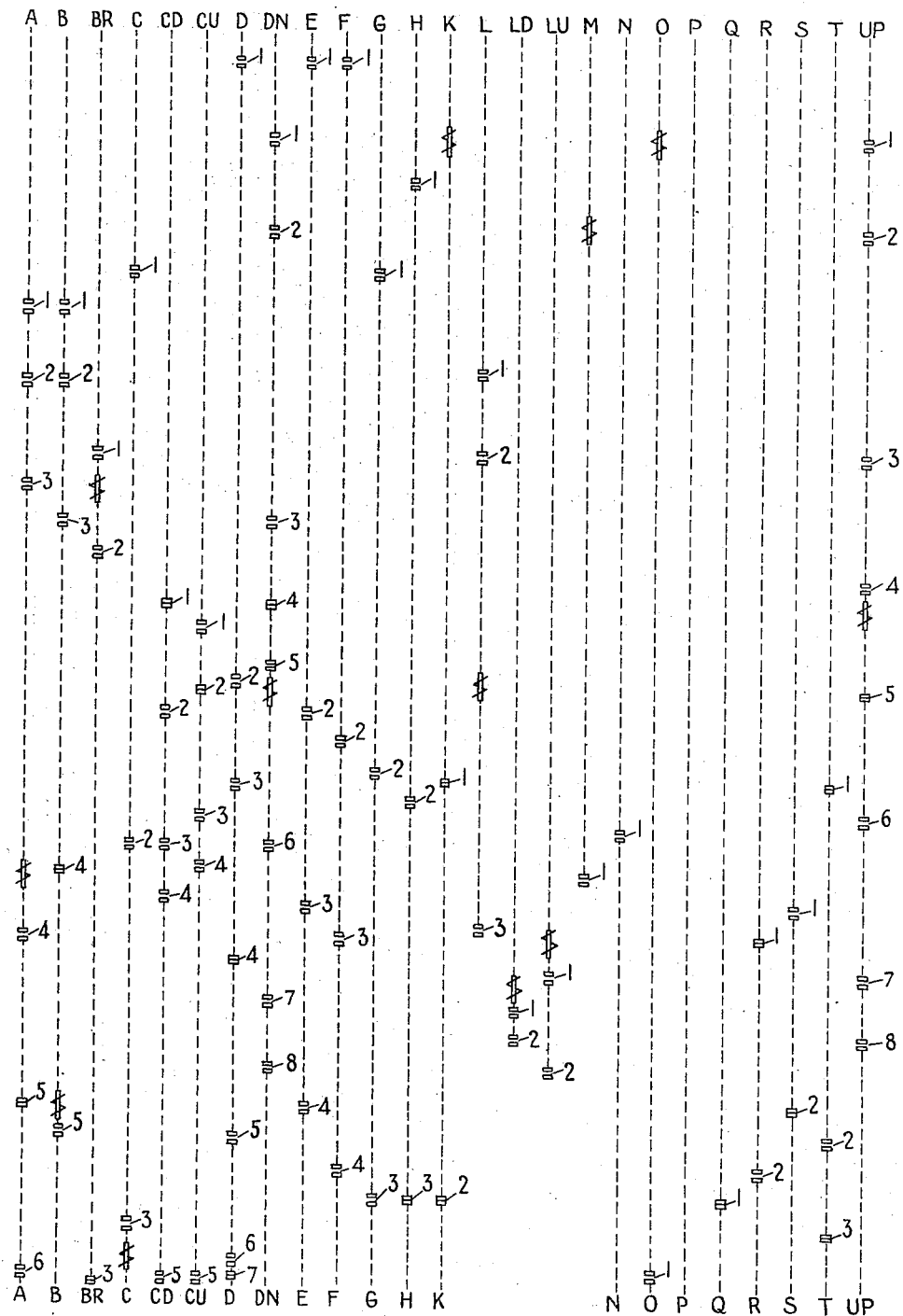
Figure 3:
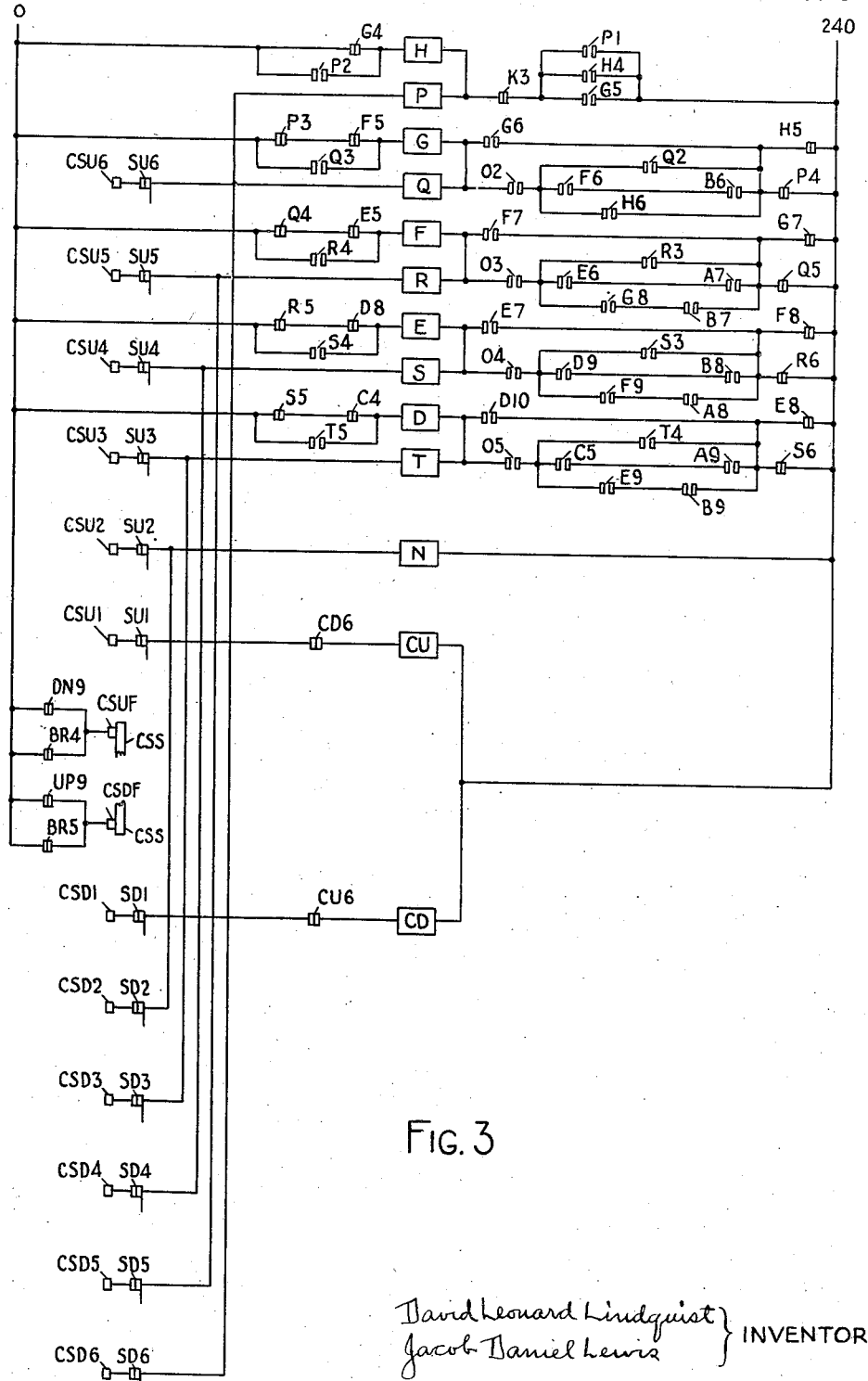
Figure 3S:
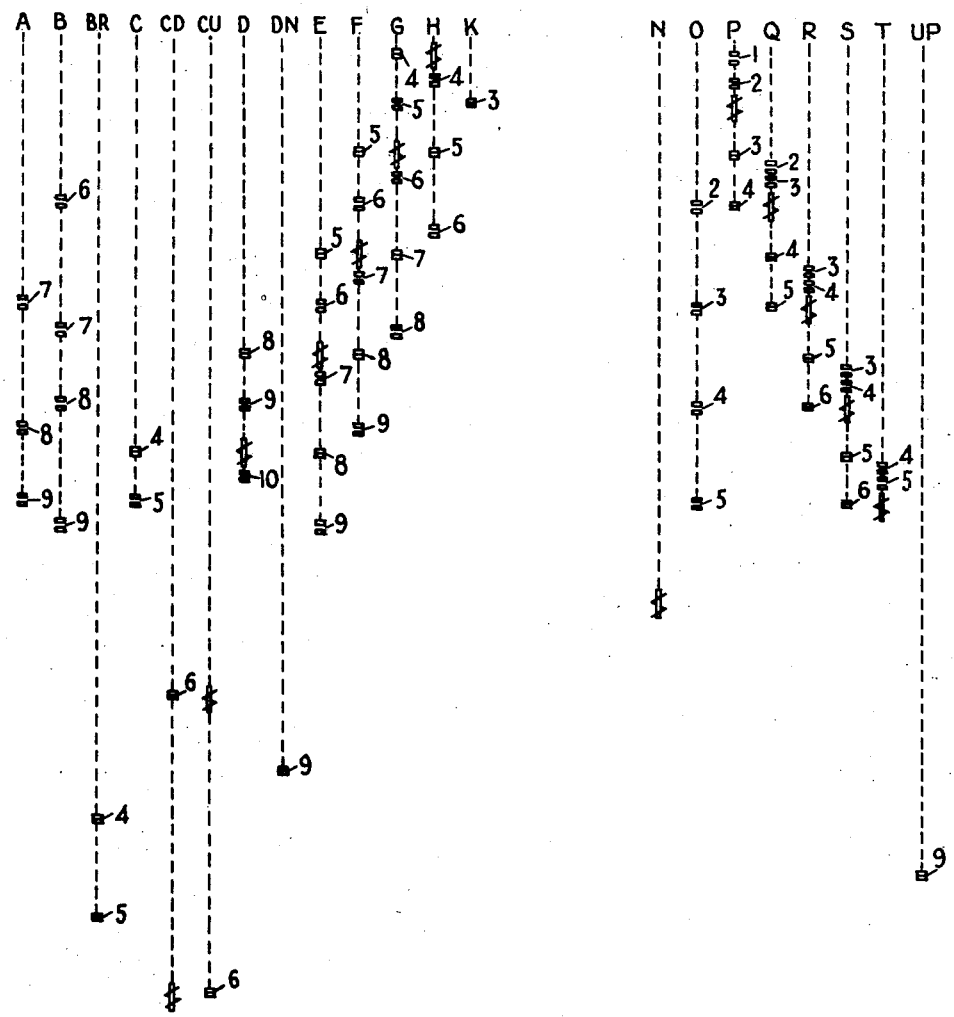

In the drawings:

Figure 1 is a schematic representation of an elevator installation embodying the invention;

Figures 2 and 3 taken together constitute a simplified schematic wiring diagram of a control system for the elevator illustrated in Figure 1, embodying the invention; and Figures 2s and 3s are key diagrams for Figures 2 and 3 respectively, showing the electromagnetic switches in spindle form with the contacts and coils arranged on the spindles in horizontal alignment with the corresponding contacts and coils in the wiring diagrams.

For a general understanding of the invention, reference may be had to Figure 1, wherein various parts of a system chosen to illustrate the principles of the invention are indicated by legend.

The elevator car is raised and lowered by means of a direct current hoisting motor which drives a traction sheave over which pass hoisting ropes from the car to the counterweight. An electromechanical brake is applied in stopping the car and holding the car when at rest. The multi-voltage source, which is utilized for a number of elevators, is illustrated as comprising two direct current dynamo-electric machines, each having a double wound armature and each armature winding having its own commutator. These windings are connected in series relation and taps are taken off at the brushes to provide the desired voltage steps. The armatures are mechanically connected together. This unit, which is usually termed a balancer set, is illustrated as driven by an alternating current motor. The rate of change of voltage as the hoisting motor armature is transferred from one voltage step to another is controlled by the generator of an auxiliary motor generator set. This generator is illustrated as comprising two armature windings, each having its own commutator, with the armature driven by an alternating current motor.

The invention is illustrated as applied to a system in which the operation of the car is controlled by means of a car switch in the elevator car. Also, levelling mechanism is indicated for bringing the car in stopping to an exact landing level. This mechanism comprises a levelling switch carried by the car for cooperating at each floor with stationary levelling cams for that floor located in the elevator hatchway. Various electromagnetic switches utilized in the control system are arranged on the control panel.

Reference may now be had to Figures 2 and 3 which illustrate diagrammatically the various control and power circuits. The circuits are shown in "straight" or "across-the-line" form, in which the coils and contacts of the various electromagnetic switches are separated in such manner as to render the circuits as simple and direct as possible. The relationship of these coils and contacts may be seen from Figures 2s and 3s where the switches are arranged in alphabetical order and shown in spindle form. The position of these coils and contacts in the wiring diagram may be found by referring to Figures 2s and 3s where the coils and contacts are positioned on the spindles in horizontal alignment with the corresponding elements of the wiring diagram. The circuits of Figures 2 and 3 are joined together as indicated by the extension of the vertical feed lines from one sheet to the next.

Balancer set voltage steps of 60 volts have been assumed and the feed lines connected to the balancer set are designated 0, 60, 120, 180 and 240 as indicative of the voltage of these lines. A 5-pole knife switch designated MLS is provided for connecting the elevator control and power circuits to the balancer set. The armature of the elevator hoisting motor is designated EM and its field winding EMF. The armature windings of the generator of the auxiliary motor generator set are designated GE1 and GE2, the generator separately excited field winding being designated GF and the series field winding GSF. With balancer voltage steps of 60 volts, the full voltage of each of generator armature windings GE1 and GE2 is 30 volts. RS1 is a resistance for controlling the strength of field winding GF. The driving motor of the auxiliary motor generator set is not shown in the wiring diagram. The stationary contacts of the car switch are designated CSUF, CSU1, CSU2, CSU3, CSU4, CSU5, CSU6, CSDF, CSD1, CSD2, CSD3, CSD4, CSD5 and CSD6. The bridging segment of the car switch is designated CSS. The release coil of the electromechanical brake is designated BK. The contacts of the levelling switch are designated LVU and LVD while the electromagnet for retracting the levelling switch is designated LEV. RS2, RS3 and RS4 are control resistances. Contacts of the terminal stopping switch are designated SU1, SU2, SU3, SU4, SU5, SU6, SD1, SD2, SD3, SD4, SD5 and SD6.

A simple control system has been illustrated. This has been done because it facilitates disclosure of the invention. It is to be understood, therefore, that other control elements and safety elements may be used in making up the system and that such system is subject to many variations.

The electromagnetic switches employed in the system illustrated are designated as follows:

A—Generator field control switch
B—Generator field control switch
BR—Brake relay
C—Slow speed switch
CD—Down slow speed relay
CU—Up slow speed relay
D—Second speed switch
DN—Down direction switch
E—Third speed switch
F—Fourth speed switch
G—Fifth speed switch
H—Full speed switch
K—Voltage relay
L—Levelling relay
LD—Down levelling direction switch
LU—Up levelling direction switch
M—Voltage relay
N—First speed switch
O—Voltage relay
P—Full speed relay
Q—Fifth speed relay
R—Fourth speed relay
S—Third speed relay
T—Second speed relay
UP—Up direction switch Throughout the description which follows, these letters will be applied to the coils of the above designated switches. Also, with reference numerals appended thereto they will be applied to the contacts of these switches, as for example B3. The electromagnetic switches are illustrated in deenergized condition.

Assume that the knife switch MLS is closed. To start the car in the up direction, the car switch segment CSS is moved upward. Assume that it is moved to full speed up position bridging contacts CSUF, CSU1, CSU2, CSU3, CSU4, CSU5 and CSU6. Upon engaging contact CSU1, it completes a circuit for the coil of up slow speed relay CU. This circuit is from line 0 through contacts BR4, car switch up feed contact CSUF, segment CSS, contact CSU1, contacts SU1 and CD6 and coil CU to line 240. The engagement of this segment with contact CSU2 completes a circuit through contacts SU2 for the coil of first speed switch N. The engagement of the segment with the remaining contacts does not complete circuits at this time. Relay CU, upon operation, engages contacts CU1, CU3, CU4 and CU5 and separates contacts CU2 and CU6. Switch N, upon operation, engages contacts N1. Contacts CU6 are interlock contacts in the circuit for the coil of down slow speed relay CD. Contacts CU4 complete a circuit for the levelling magnet LEV to retract the levelling mechanism. In the schematic arrangement of Figure 1, this is effected by pulling up on plunger 15 which acts on the arm 16 of plate 17 to swing the plate clockwise about its pivot 18 against the force of biasing spring 20. This moves the levelling rollers 21 into positions to clear the levelling cams. Contacts N1 complete a circuit for the coil of levelling relay L. Levelling relay L, upon operation, engages contacts L1, L2 and L3. Contacts L3 by-pass contacts CU4 in the circuit for the levelling magnet. Contacts L1 short-circuit resistance RS1 in the circuit for generator field winding GF.

Contacts CU5 complete a circuit through contacts BR3, and contacts T3 and D7 in parallel for the coil of slow speed switch C. Switch C, upon operation, engages contacts C1, C2, C3 and C5 and separates contacts C4. Contacts C3 establish a holding circuit for the coil of switch C through resistance RS4. Contacts CU1 complete a circuit through contacts CD1 and DN4 for the coil of up direction switch UP. The up direction switch, upon operation, engages contacts UP1, UP2, UP3, UP4, UP6, UP7 and UP8 and separates contacts UP5 and UP9. Contacts UP1 and UP2 establish a circuit for hoisting motor armature EM for up car travel, this circuit extending through contacts C1, generator armature winding GE1, and generator series field winding GSF. Contacts UP4 establish a self-holding circuit through resistance RS2 for the coil of the up direction switch, by-passing contacts CU1. Contacts UP5 are interlock contacts in the circuit for the coil of down direction switch DN.

Contacts UP6 complete a circuit through contacts C2, CU3, K1 and B4 for the coil of generator field control switch A. Switch A, upon operation, engages contacts A1, A2, A3, A4, A6, A7, A8 and A9 and separates contacts A5. Contacts A5 are interlock contacts in the circuit for the coil of switch B. Contacts A4 by-pass contacts K1 in the circuit for the coil of switch A. Contacts A1 and A2 complete a circuit for the generator field winding GF to cause generator armature winding GE1 to apply voltage of a polarity to armature EM for starting the car in the up direction. Contacts A3 complete a circuit for the coil of brake relay BR through contacts UP3. Relay BR, upon operation, engages contacts BR1 and BR2 and separates contacts BR3, BR4 and BR5. Contacts BR1 establish a by-pass circuit through contacts L2 for contacts A3 in the circuit for the coil of brake relay BR. Contacts BR4 are by-passed by contacts DN9 to maintain the circuit to up feed contact CSUF of the car switch. The coil of switch C is maintained energized through contacts C3 after the separation of contacts BR3. Contacts BR2 complete the circuit for the release coil of the electromechanical brake BK, causing the brake to be released and the car is started in the up direction.

The voltage of each generator armature winding gradually builds up at a rate determined by the time constant of the generator field. As the hoisting motor armature is connected across armature winding GE1, the voltage applied to the motor armature rises to 30 volts, increasing the speed of the elevator car.

During the initial rise in voltage of the generator, relay K operates, separating contacts K1, K2 and K3. Contacts K1 are by-passed by contacts A4 to maintain the coil of switch A energized. As the voltage of the generator armature winding GE2 nears 30 volts, relay O operates to engage contacts O1, O2, O3, O4 and O5. Contacts O5 complete a circuit for the coil of second speed relay T through car switch contact CSU3, contacts SU3, C5 and A9 and contacts S6 and E8 in parallel. Relay T, upon operation, engages contacts T2, T4 and T5 and separates contacts T1 and T3. The coil of switch C is maintained energized after the separation of contacts T3 through contacts D7. Contacts T4 establish a holding circuit for the coil of relay T, by-passing contacts C5 and A9. Contacts T5 complete a circuit for the coil of second speed switch D through contacts O5 and T4 and contacts S6 and E8 in parallel. Switch D, upon operation, engages contacts D1, D2, D3, D5, D6, D9 and D10 and separates contacts D4, D7 and D8. Contacts D10 establish a holding circuit for the coils of switch D and relay T. Contacts D2 by-pass contacts N1 in the circuit for the coil of relay L. Contacts D1 connect armature EM through generator armature winding GE2 to line 60, armature EM remaining connected to generator armature winding GE1. The 30 volts of winding GE2 oppose the 60 volts of the first voltage step so that 30 volts are still applied to armature EM.

The separation of contacts D7, owing to the fact that contacts T3 are separated, breaks the circuit for the coil of slow speed switch C. Switch C, upon dropping out, separates contacts C1, C2, C3 and C5 and engages contacts C4. Contacts C5 are by-passed by contacts T4 and D10. The separation of contacts C1 disconnects one side of generator armature winding GE1 from armature EM. The separation of contacts C2 breaks the circuit for the coil of switch A. Switch A, upon dropping out, separates contacts A1, A2, A3, A4, A6, A7, A8 and A9 and engages contacts A5. Contacts A3 are by-passed by contacts L2 and BR1. Contacts A9 are by-passed by contacts D10. Contacts A5 prepare the circuit for the coil of switch B. The separation of contacts A1 and A2 breaks the circuit for the generator field winding, causing the generator voltage to decrease. Thus as the opposing voltage of generator winding GE2 dies out, the voltage applied to armature EM gradually rises to the full 60 volts of the first voltage step.

As the voltage of generator armature winding GE2 decreases, relay O drops out. When the voltage of winding GE2 nears zero, relay K drops out, reengaging contacts K2 to complete a circuit for the coil of switch B through contacts D5, T2 and A5. Switch B, upon operation, engages contacts B1, B2, B3, B5, B6, B7, B8 and B9 and separates contacts B4. Contacts B4 are interlock contacts in the circuit for the coil of switch A. Contacts B5 by-pass contacts K2 in the circuit for the coil of switch B. Contacts B1 and B2 reestablish the circuit for generator field winding GF but in a direction to provide excitation of a polarity opposite to that obtained with switch A operated. As a result, the voltage of generator armature winding GE2 builds up to assist that of the first voltage step, gradually bringing the voltage applied to armature EM up to 90 volts.

As this voltage increase takes place, relay K again operates to separate contacts K2, these contacts being by-passed, however, by contacts B5 to maintain the coil of switch B energized. As the voltage of winding GE2 nears 30 volts, relay O operates to engage contacts O4, completing a circuit for the coil of third speed relay S through car switch contact CSU4, contacts SU4, D9 and B8 and contacts R6 and F8 in parallel. Relay S, upon operation, engages contacts S1, S3 and S4 and separates contacts S2, S5 and S6. The coils of switch D and relay T are maintained energized after the separation of contacts S6 through contacts E8, the coil of switch D also being maintained energized after the separation of contacts S5 through contacts T5. Contacts S3 establish a holding circuit for the coil of relay S, by-passing contacts D9 and B8. Contacts S4 complete a circuit for the coil of third speed switch E through contacts O4 and S3 and contacts R6 and F8 in parallel. Switch E, upon operation, engages contacts E1, E2, E3, E4, E6, E7 and E9 and separates contacts E5 and E8. Contacts E7 establish a holding circuit for the coils of switch E and relay S. Contacts E2 bypass contacts D2 and N1 in the circuit for the coil of relay L. Contacts E1 connect armature EM through generator armature winding GE1 to line 120, armature EM remaining connected through generator armature winding GE2 to line 60. The 30 volts of winding GE1 oppose the 60 volts of the second voltage step so that at this moment 90 volts are still applied to armature EM.

The separation of contacts E8, owing to the fact that contacts S6 are separated, breaks the circuit for the coils of second speed switch D and relay T. Relay T, upon dropping out, separates contacts T2, T4 and T5 and engages contacts T1 and T3. Switch D, upon dropping out, separates contacts D1, D2, D3, D5, D6, D9 and D10 and engages contacts D4, D7 and D8. Contacts D8 are by-passed by contacts S3 and E7. Contacts D2 are by-passed by contacts N1 and E2. The separation of contacts D1 disconnects armature EM from line 60. The separation of contacts D5 and T2 breaks the circuit for the coil of switch B. Switch B, upon dropping out, separates contacts B1, B2, B3, B5, B6, B7, B8 and B9 and engages contacts B4. Contacts B8 are by-passed by contacts E7 to maintain switch E and relay S energized. The separation of contacts B1 and B2 breaks the circuit for generator field winding GF, causing the generator voltage to decrease. Thus the voltage of generator armature winding GE1 gradually decreases its opposition to the 60 volts of the second voltage step, causing the voltage applied to armature EM to rise to 120 volts.

As the generator voltage dies down, relay O drops out separating contacts O4, but without effect as they are by-passed by contacts E7. As the voltage of generator armature winding GE2 nears zero, relay K drops out to reengage contacts K1, completing a circuit through contacts E3, S1 and B4 for the coil of switch A. Switch A, upon operation, engages contacts A1 and A2 to reestablish the circuit for generator field winding GF to provide excitation of the polarity dictated by switch A. Thus the voltage of generator armature winding GE1 now adds to that of the 120 volts of the supply lines, causing the voltage applied to armature EM gradually to rise to 150 volts.

As the voltage of generator armature winding GE2 nears 30 volts, relay O operates to engage contacts O3, completing a circuit for the coil of fourth speed relay R through car switch contact CSU5, contacts SU5, E6 and A7 and contacts Q5 and G7 in parallel. Relay R, upon operation, engages contacts R2, R3 and R4 and separates contacts R1, R5 and R6. The coils of switch E and relay S are maintained energized after the separation of contacts R6 through contacts F8, the coil of switch E also being maintained energized after the separation of contacts R5 through contacts S4. Contacts R3 establish a holding circuit for the coil of relay R, by-passing contacts E6 and A7. Contacts R4 complete a circuit for the coil of fourth speed switch F through contacts O3 and R3 and contacts Q5 and G7 in parallel. Switch F, upon operation, engages contacts F1, F2, F3, F4, F6, F7 and F9 and separates contacts F5 and F8. Contacts F7 establish a holding circuit for the coils of switch F and relay R. Contacts F2 by-pass contacts E2 and N1 in the circuit for the coil of relay L. Contacts F1 connect armature EM through generator armature winding GE2 to line 180, armature EM remaining connected through generator armature winding GE1 to line 120. The 30 volts of winding GE2 oppose the 60 volts of the third voltage step so that at this moment 150 volts are still applied to armature EM.

The separation of contacts F8, owing to the fact that contacts R6 are separated, breaks the circuit for the coils of switch E and relay S. Relay S, upon dropping out, separates contacts S1, S3 and S4 and engages contacts S2, S5 and S6. Switch E, upon dropping out, separates contacts E1, E2, E3, E4, E6, E7 and E9 and engages contacts E5 and E8. Contacts E6 are by-passed by contacts R3 and F7. Contacts E2 are by-passed by contacts F2 and N1. The separation of contacts E1 disconnects armature EM from line 120. The separation of contacts E3 and S1 breaks the circuit for the coil of switch A which drops out. The resultant separation of contacts A7 is without effect as they are by-passed by contacts F7. The separation of contacts A1 and A2 breaks the circuit for the generator field winding, causing the generator voltage to decrease with the result that the voltage applied to armature EM gradually rises to 180 volts.

As the voltage of generator armature winding GE2 nears zero, relay K drops out. The resultant engagement of contacts K2 reestablishes the circuit for the coil of switch B through contacts F4, R2 and A5. Switch B, upon operation, engages contacts B1 and B2 to reestablish the circuit for generator field winding GF and as before for a polarity opposite to that obtained with switch A operated. As a result the voltage of generator armature winding GE2 builds up to assist the 180 volts of the supply lines, gradually bringing the voltage applied to armature EM up to 210 volts.

As the voltage rise takes place relay O operates, engaging contacts O2 to complete a circuit for the coil of fifth speed relay Q through car switch contact CSU6, contacts SU6, F6 and B6 and contacts P4 and H5 in parallel. Relay Q, upon operation, engages contacts Q2 and Q3 and separates contacts Q1, Q4 and Q5. The coils of switch F and relay R are maintained energized after the separation of contacts Q5 through contacts G7, the coil of switch F also being maintained energized after the separation of contacts Q4 through contacts R4. Contacts Q2 establish a holding circuit for the coil of relay Q, by-passing contacts F6 and B6. Contacts Q3 complete a circuit for the coil of fifth speed switch G through contacts O2 and Q2 and contacts P4 and H5 in parallel. Switch G, upon operation, engages contacts G1, G2, G3, G5, G6 and G8 and separates contacts G4 and G7. Contacts G6 establish a holding circuit for the coils of switch G and relay Q. Contacts G2 by-pass contacts F2 and N1 in the circuit for the coil of relay L. Contacts G1 connect armature EM through generator armature winding GE1 to line 240, armature EM remaining connected through generator armature winding GE2 to line 180. The 30 volts of winding GE1 oppose the 60 volts of the last voltage step so that at this moment 210 volts are still applied to armature EM.

The separation of contacts G7, owing to the fact that contacts Q5 are separated, breaks the circuit for the coils of switch F and relay R. Relay R, upon dropping out, separates contacts R2, R3 and R4 and engages contacts R1, R5 and R6. Switch F, upon dropping out, separates contacts F1, F2, F3, F4, F6, F7 and F9 and engages contacts F5 and F8. Contacts F6 are by-passed by contacts Q2 and G6. Contacts F2 are by-passed by contacts N1 and G2. The separation of contacts F1 disconnects armature EM from line 180. The separation of contacts F4 and R2 breaks the circuit for the coil of switch B. The resultant separation of contacts B6 is without effect as the coils of switch G and relay Q are by-passed by contacts G6. The separation of contacts B1 and B2 breaks the circuit for the generator field winding with the result that the voltage of generator winding GE1 dies down and the voltage applied to armature EM is gradually increased to 240 volts.

As the voltage of generator armature winding GE2 nears zero, switch K drops out to engage contacts K3, completing a circuit for the coil of full speed relay P through car switch contact CSU6 and contacts SU6 and G5. Relay P, upon operation, engages contacts P1 and P2 and separates contacts P3 and P4. The coils of switch G and relay Q are maintained energized after the separation of contacts P4 through contacts H5, the coil of switch G also being maintained energized after the separation of contacts P3 through contacts Q3. Contacts P1 establish a holding circuit for the coil of relay P, by-passing contacts G5. Contacts P2 complete a circuit for the coil of full speed switch H through contacts K3 and P1. Switch H, upon operation, engages contacts H1, H2, H4 and H6 and separates contacts H3 and H5. Contacts H2 by-pass contacts G2 and N1 in the circuit for the coil of relay L. Contacts H4 establish a holding circuit for the coils of switch H and relay P. Contacts H1 connect armature EM directly to line 240. The separation of contacts H5, owing to the fact that contacts P4 are separated, breaks the circuit for the coils of switch G and relay Q. Relay Q drops out, separating contacts Q2 and Q3 and engaging contacts Q1, Q4, and Q5. Switch G drops out, separating contacts G1, G2, G3, G5, G6 and G8 and engaging contacts G4 and G7. Contacts G2 are by-passed by contacts H2 and N1. Similarly contacts G5 are by-passed by contacts H4 and P1 and contacts G4 are by-passed by contacts P2. The separation of contacts G1 disconnects generator armature winding GE1 from line 240. This completes the accelerating operation to bring the car up to full speed. Under these conditions switches UP, N and H and relays CU, BR, L and P are operated and the other switches and relays operated in the description of starting the car in the up direction have dropped out.

Assume now that car switch segment CSS is centered to stop the car at a floor. This breaks the circuit for the coils of switch N and relays CU and P. The coil of relay L is maintained energized through contacts H2 after the separation of contacts N1. Relay CU, upon dropping out, separates contacts CU1, CU3, CU4 and CU5 and engages contacts CU2 and CU6. Contacts CU1 are by-passed by contacts UP4 to maintain the up direction switch operated. Contacts CU4 are by-passed by contacts L3 to maintain levelling magnet LEV energized. Relay P, upon dropping out, separates contacts P1 and P2 and engages contacts P3 and P4. Contacts P1 and P2 are by-passed by contacts G4 and H4 to maintain the coil of switch H energized. Contacts P3 and P4 reestablish the circuit for the coil of fifth speed switch G through contacts F5 and H6, causing switch G to reoperate. The resultant engagement of contacts G1 connects generator armature winding GE1 to line 240. Contacts G4 break the circuit for the coil of switch H which drops out. The resultant separation of contacts H2 is without effect as they are by-passed by contacts G2 to maintain relay L operated. Contacts H6 are by-passed by contacts G5 to maintain switch G operated. The separation of contacts H1 breaks the circuit connecting armature EM directly to line 240. Contacts H3 complete a circuit through contacts G3, Q1, K2 and A5 for the coil of switch B. Switch B operates to engage contacts B1 and B2 which completes a circuit for generator field winding GF to cause the voltage of generator armature winding GE1 to build up in opposition to the 60 volts of the last voltage step, gradually reducing the voltage applied to armature EM to 210 volts and thus causing the elevator motor to slow down.

As the voltage of generator armature winding GE2 nears 30 volts, relay O operates to engage contacts O3 which completes a circuit through contacts Q4, E5, G8, B7 and Q5 for the coil of fourth speed switch F, causing this switch to reoperate. The resultant reengagement of contacts F1 connects armature EM through generator armature winding GE2 to line 180, armature EM remaining connected through generator armature winding GE1 to line 240. The voltage of winding GE2 adds to the 60 volts of the third voltage step so that at this moment 210 volts are still applied to armature EM.

The separation of contacts F5 breaks the circuit for the coil of fifth speed switch G which drops out. The resultant separation of contacts G2 is without effect as the coil of relay L is maintained energized through contacts F2. Contacts G8 are by-passed by contacts F7. The separation of contacts G1 disconnects armature EM from line 240. The separation of contacts G3 breaks the circuit for the coil of switch B which drops out. The resultant separation of contacts B7 is without effect as they are by-passed by contacts F7. The separation of contacts B1 and B2 breaks the circuit for the generator field winding with the result that the voltage of generator armature winding GE2 dies down gradually to decrease the voltage applied to armature EM to 180 volts.

As the voltage of winding GE2 approaches zero, relay K drops out to reengage contacts K1, completing a circuit through contacts F3, R1 and B4 for the coil of switch A. Switch A, upon operation, engages contacts A1 and A2 to complete a circuit for the generator field winding to cause the voltage of generator armature winding GE2 to build up of a polarity to oppose the 60 volts of the third voltage step, thereby gradually reducing the voltage applied to armature EM to 150 volts.

As the voltage of winding GE2 nears 30 volts, relay O operates to engage contacts O4 which completes a circuit for the coil of third speed switch E through contacts R5, D8, F9, A8 and R6. Switch E reoperates to engage contacts E1 which connects armature EM to line 120 through generator armature winding GE1, armature EM remaining connected through generator armature winding GE2 to line 180. The voltage of winding GE1 adds to the 60 volts of the second voltage step so that at this moment 150 volts are still applied to armature EM.

The separation of contacts E5 breaks the circuit for the coil of fourth speed switch F which drops out. The coil of relay L is maintained energized after the separation of contacts F2 through contacts E2. Contacts F9 are by-passed by contacts E7. The separation of contacts F1 disconnects armature EM from line 180. The separation of contacts F3 breaks the circuit for the coil of switch A which drops out. The resultant separation of contacts A8 is without effect as they are by-passed by contacts E7. The separation of contacts A1 and A2 breaks the circuit for the generator field winding with the result that the voltage of generator armature winding GE1 dies down gradually to decrease the voltage applied to armature EM to 120 volts.

As the voltage of generator armature winding GE2 approaches zero, switch K drops out to reengage contacts K2, completing a circuit for the coil of switch B through contacts E4, S2 and A5. Switch B, upon operation, engages contacts B1 and B2, completing a circuit for generator field winding GF to cause the voltage of generator armature winding GE1 to build up in opposition to the 60 volts of the second voltage step, gradually reducing the voltage applied to armature EM to 90 volts.

As the voltage of generator armature winding GE2 nears 30 volts, relay O operates. The resultant engagement of contacts O5 completes a circuit for the coil of second speed switch D through contacts S5, C4, E9, B9 and S6. Switch D reoperates to engage contacts D1 which connects armature EM through generator armature winding GE2 to line 60, armature EM remaining connected through generator armature winding GE1 to line 120. The voltage of winding GE2 assists that of the first voltage step, causing 90 volts to be applied to armature EM.

The separation of contacts D8 breaks the circuit for the coil of third speed switch E which drops out. The coil of relay L is maintained energized after the separation of contacts E2 through contacts D2. The separation of contacts E1 disconnects armature EM from line 120. The separation of contacts E4 breaks the circuit for the coil of switch B which drops out. The resultant separation of contacts B1 and B2 breaks the circuit for the generator field winding with the result that the voltage of generator armature winding GE2 dies down gradually to decrease the voltage applied to armature EM to 60 volts.

As the voltage of generator armature winding GE2 approaches zero, relay K drops out. The resultant engagement of contacts K1 completes a circuit for the coil of switch A through contacts D3, T1 and B4. Switch A operates to engage contacts A1 and A2 which completes a circuit for the generator field winding to cause the voltage of generator armature winding GE2 to build up in opposition to the 60 volts of the first voltage step, gradually reducing the voltage applied to armature EM to 30 volts.

As the voltage of winding GE2 nears 30 volts, relay O operates to engage contacts O1 which completes a circuit through contacts D6, A6 and T3 for the coil of slow speed switch C. Switch C, upon operation, engages contacts C3 to establish a self-holding circuit. It also engages contacts C1 to connect generator armature winding GE1 across armature EM to apply 30 volts to the armature, armature EM remaining connected to line 60 through generator armature winding GE2.

Switch C also separates contacts C4 which breaks the circuit for the coil of switch D. Switch D drops out separating contacts D3, but this is without effect as the coil of switch A is maintained energized through contacts C2 and M1, relay M being operated at this time. The separation of contacts D1 disconnects armature EM from line 60. The separation of contacts D2 breaks the circuit for levelling relay L. Relay L, upon dropping out, separates contacts L1, L2 and L3. Contacts L2 are by-passed by contacts A3. The separation of contacts L3 deenergizes levelling magnet LEV, permitting spring 20 (Figure 1) to swing plate 17 counterclockwise and thus extend the levelling rollers for cooperation with the levelling cams for the floor at which the stop is being made. The separation of contacts L1 inserts resistance RS1 in circuit with the generator field winding to reduce the generator field strength to a value suitable for the levelling operation, thus further reducing the voltage applied to armature EM.

As the voltage of generator armature winding GE1 dies down and reaches a certain value, relay M drops out separating contacts M1. Assuming that the car has underrun the floor, the levelling mechanism acts to maintain the excitation of the generator field winding to bring the car to the floor level. As the car comes into the floor and with the levelling magnet deenergized, the up levelling roller 21 (Figure 1) engages the left hand cam to effect the engagement of up levelling contacts LVU against the force of spring 22. This completes the circuit through contacts D4 for the coil of up levelling direction switch LU which operates to engage contacts LU1 and LU2. Thus the coil of switch A is maintained energized through contacts LU1, UP7 and B4. Switch A is therefore maintained operated to cause the continued energization of the generator field winding and the release of the brake. As the car arrives at the floor, the roller runs off the cam and contacts LVU separate. This breaks the circuit for the coil of up levelling direction switch LU which drops out. The resultant separation of contacts LU1 breaks the circuit for the coil of switch A which drops out. Switch A in dropping out separates contacts A1 and A2 to break the circuit for the generator field winding. It also separates contacts A3, breaking the circuit for brake relay BR which drops out. The resultant separation of contacts BR2 deenergizes the release coil BK of the electromechanical brake, causing the brake to be applied to bring the car to a stop at the floor.

Should the car overrun the floor, that is should the down levelling roller be in engagement with the right hand cam at the time contacts M1 separate, down levelling contacts LVD are engaged, completing the circuit for the coil of down levelling direction switch LD which operates to engage contacts LD1 and LD2. Thus, upon the separation of contacts M1 and consequent dropping out of switch A to bring the car to a stop the engagement of contacts A5 completes a circuit through contacts LD2 and UP8 for the coil of switch B. Switch B, upon operation, engages contacts B1 and B2 to establish a circuit for the generator field winding to cause generator armature winding GE1 to generate voltage of opposite polarity. As the same time contacts B3 reestablish the circuit for the coil of brake relay BR which engages contacts BR2 to effect the release of the brake. Thus the hoisting motor operates to return the car to the floor. As the car reaches the floor, the roller runs off the cam and contacts LVD separate to deenergize down levelling direction switch LD. Switch LD drops out to separate contacts LD2 which breaks the circuit for the coil of switch B. Switch B, upon dropping out, separates contacts B1, B2 and B3 to deenergize the generator field winding and to effect the deenergization of the brake release coil to cause the car to be brought to a stop.

If instead of returning the car switch segment from full speed running position to neutral, it is returned to some intermediate point, the car is caused to run at the same speed as it would have attained if the car switch segment had been moved only to that point initially in the starting operation. Assume that with the car running full speed in the up direction the car switch segment is moved off only contact CSU6. Relay P drops out as before to establish a circuit for the coil of switch G which upon operation causes switch H to drop out and switch B to operate to effect a reduction in the voltage applied to armature EM to 210 volts. Relay O operates as the voltage of winding GE2 nears 30 volts to engage contacts O3. This not only establishes the circuit for the coil of fourth speed switch F but also the circuit for the coil of fourth speed relay R through car switch contact CSU5. Thus at the time switch F operates relay R also operates. Switch F engages contacts F1 as before to connect armature EM in series with generator armature winding GE2 to line 180. The voltage of winding GE2 adds to the 60 volts of the third voltage step to cause 210 volts to be applied to armature EM. Contacts F5 separate to break the circuit for the coil of fifth speed switch G which drops out. The resultant separation of contacts G1 disconnects armature EM from line 240. The separation of contacts G3, however, does not break the circuit for the coil of switch B as this coil is now maintained energized through contacts F4 and R2. Thus 210 volts are maintained applied to armature EM, the same as would be applied if the car switch segment in starting had only been moved as far as contact CSU5. Upon moving the car switch segment off contact CSU5 to further reduce the speed, relay R is dropped out immediately. The resultant separation of contacts R2 breaks the circuit for the coil of switch B to initiate further slowing down of the car as will be understood from the above description.

If with the car running full speed in the up direction the car switch segment is moved off both contact CSU6 and contact CSU5 but is maintained in engagement with contact CSU4, it is believed that it will be understood from the above description that upon the engagement of contacts O4 as a result of the operation of switch A, relay S is operated along with switch E and contacts E3 and S1 engage to establish another circuit for the coil of switch A. Thus switch A is maintained operated after the separation of contacts F3 so that 150 volts are maintained applied to armature EM, the same as would be applied if the car switch segment in starting had only been moved as far as contact CSU4. Similarly, if the car switch segment in being moved out of full speed position had been stopped in engagement with contact CSU3, relay T is operated along with switch D upon the engagement of contacts O5. Thus contacts D5 and T2 maintain the coil of switch B energized after the separation of contacts E4 so that 90 volts are maintained applied to armature EM. Should the car switch be moved back into position bridging only contacts CSUF, CSU1 and CSU2, switch N and relay CU are maintained operated so that upon the operation of switch C in response to the engagement of contacts O1 another circuit is established for the coil of switch A through contacts C2, UP6 and CU3, contacts M1 also being in engagement at this time. Thus upon the dropping out of switch D to separate contacts D3, the coil of switch A is maintained energized and as switch N maintains relay L operated and therefore resistance RS1 short-circuited 80 volts are maintained applied to armature EM. If the car switch segment is moved back into position bridging only contacts CSUF and CSU1, switch N is dropped out so that, upon the dropping out of switch D, relay L drops out to remove the short-circuit for resistance RS1, thereby reducing the voltage applied to armature EM to the value utilized for the levelling operation. The levelling mechanism is not effective under such conditions, however, as the levelling magnet is maintained energized through contacts CU4.

It is to be noted that with the car stopped at the floor in the above example, up direction switch UP and slow down switch C remain operated. The coil of switch UP is maintained energized through contacts CD1, resistance RS2, contacts UP4 and DN4. The coil of switch C is maintained energized through contacts C3, resistance RS4 and contacts T3 and D7 in parallel. Therefore, contacts UP1, UP2 and C1 remain engaged, maintaining established the loop circuit through armature EM, generator series field winding GSF and generator armature winding GE1. Thus upon movement of the car switch segment upwardly to restart the car in the up direction up slow speed relay CU operates to engage contacts CU3 which completes a circuit for the coil of switch A through contacts C2, UP6, K1 and B4. Switch A operates as previously described to cause the operation of brake relay BR which in turn operates to cause the energization of brake release coil BK which releases the brake. At the same time switch A establishes a circuit for the generator field winding GF to cause generation of a voltage of generator armature winding GE1 of a polarity to effect starting of the car in the up direction.

If it is desired to start the car in the down direction the car switch segment is moved downwardly. Assuming that the car had been travelling in the up direction, upon the engagement of the car switch segment with contacts CSD1, a circuit is completed for the coil of down slow speed relay CD. This circuit extends through contacts BR5 (contacts UP9 being separated) and contacts SD1 and CU6. Relay CD, upon operation, engages contacts CD2, CD3, CD4 and CD5 and separates contacts CD1 and CD6. The separation of contacts CD1 breaks the circuit for the coil of up direction switch UP causing this switch to drop out. The resultant separation of contacts UP1 and UP2 breaks the circuit for armature EM for up car travel. Contacts UP9 by-pass contacts BR5 in the circuit to the car switch feed contact CSDF. Contacts UP5 complete a circuit through contacts CU2 and CD2 for the coil of down direction switch DN. Switch DN operates to engage contacts DN1, DN2, DN3, DN5, DN6, DN7 and DN8 and separates contacts DN4 and DN9. Contacts DN1 and DN2 establish a circuit for hoisting motor armature EM for down car travel. Contacts DN5 establish a self-holding circuit for the coil of the down direction switch. Contacts DN4 are interlock contacts in the circuit for the coil of up direction switch UP. Contacts DN6 complete a circuit for the coil of switch A through contacts C2, CD3, K1 and B4. Switch A operates to engage contacts A1 and A2 to complete a circuit for generator field winding GF. While this establishes the same polarity of the voltage of generator armature winding GE1 as for starting the car in the up direction, previously described, this voltage is applied to opposite terminals of armature EM, owing to the fact that contacts DN1 and DN2 are now engaged instead of contacts UP1 and UP2. Thus upon the release of the brake as a result of the engagement of contacts A3 the car is started in the down direction. It is believed that further operation to control the car in its downward travel will be understood from the above description without further detailed discussion.

The circuits to the car switch feed contacts are controlled by back contacts UP9 and DN9 on the direction switches. Contacts BR4 and BR5 on the brake relay are connected in parallel with these contacts. The purpose of this arrangement is to prevent plugging of the motor when, during running of the car, the car switch segment is thrown to an operative position for the opposite direction of car travel, while at the same time insuring a normal slow down and a normal acceleration in the opposite direction. For example, if the car were running in the up direction at full speed and the car switch segment were suddenly moved downwardly into position bridging contacts CSDF and CSD6, down slow speed relay CD can not be operated to cause reversal of the motor armature circuit as the feed to down car switch contact CSDF is broken at contacts UP9 and BR5. Thus plugging of the motor is prevented. For the same reason the circuit for the coil of full speed relay P can not be established through the down car switch contacts and thus the circuit for full speed switch H can not be completed so that a normal slow down and stopping of the car takes place. As the brake relay drops out to cause the car to be brought to a stop, it engages contacts BR5 to establish a feed to the down car switch feed contact. Thus down slow speed relay CD is operated causing the dropping out of up direction switch UP and the operation of down direction switch DN and the car is started in the down direction and accelerated in the normal manner.

It will be seen from previous description that in accordance with the invention, the change in value of the voltage applied to the armature of the hoisting motor is effected gradually for each step of acceleration and retardation. In the arrangement shown, a generator having two armature windings, the full voltage of each of which is equal to half the voltage increment of the multi-voltage supply lines, is utilized in conjunction with the multi-voltage supply lines to control the value of the applied voltage so that the voltage changes are effected gradually. The direction of travel is determined by reversing switches, the contacts of which are in the motor armature circuit. One side of the motor armature, determined by the reversing switch operated, is connected to one side of the supply lines. The other side of the motor armature is connected to opposite terminals of the generator armature windings. The other terminal of one of the generator armature windings is connected to the same side of the supply lines thus connecting the winding across the motor armature.

To start the car, the generator field winding is excited to cause the same polarity of voltage of the generator armature winding as that of the voltage of the supply lines. When the voltage builds up, the other terminal of the other generator armature winding is connected to the first step of the supply lines, thereby connecting the motor armature across the first multi-voltage step through the other generator armature winding. Due to the polarity of connection of the other generator armature winding, its voltage is in opposition to that of the supply lines. The other terminal of the first generator armature winding is then disconnected from the supply lines and the excitation of the generator is discontinued and then built up in the opposite direction. When the voltage builds up, the other terminal of the first generator armature winding is connected to the second voltage step, the polarity thus provided causing its voltage to oppose the supply line voltage. The above operations are repeated for each succeeding step, the motor armature being connected to succeeding supply lines through the generator armature windings alternately and oppositely, i. e., through the other generator armature winding to supply line steps one and three and through the first generator armature winding in the opposite direction to supply line steps two and four. In each case, when the transfer is made, the generator excitation is discontinued and then built up in the opposite direction except in the case of the last step when the motor armature is connected directly across the full voltage of the supply lines when the generator excitation dies down.

To slow down the car, the motor armature is connected through the first generator armature winding to the last step of the supply lines and the generator excitation is built up. The polarity of the connection of the first generator armature winding and the polarity of the generator excitation is the same as for acceleration so that the voltage of the first generator armature winding opposes the source voltage. When the generator voltage has been built up, the motor armature is connected through the other generator armature winding to the third voltage step, the polarity of connection of the other generator winding being opposite to that of the first generator armature winding, the same as for acceleration. The motor armature is then disconnected from the last step and the excitation of the generator is discontinued and then built up in the opposite direction. These operations are repeated for each successive step, the motor armature being connected to succeeding supply lines through the generator armature windings alternately and oppositely and when the transfer is made the generator excitation is discontinued and then built up in the opposite direction. From the first step, the motor armature is transferred to across the first generator armature winding, the polarity of connection and the excitation of the generator being the same as for starting. In case the car tends to underrun the landing this connection is maintained to bring the car to the landing level at reduced generator excitation. In case the car overruns the landing the excitation of the generator is reversed to bring the car back to the landing level.

Thus a multi-voltage system is provided in which the voltage change on each step is effected gradually, the rate of change being dependent upon the time constant of the generator field. The motor generator set is small and in the arrangement illustrated is about one-eighth the capacity of the motor. In certain instances, the rate of change in voltage may be controlled by controlling the strength of the generator field in steps. Two variable voltage generators may be utilized instead of one generator with two armature windings and in certain instances other combinations of supply lines and generating means may be utilized. For example, multi-voltage supply lines of other numbers of steps or in which the steps are not equal may be utilized. Also two generators of unequal voltage may be utilized or one generator with only one armature winding may be employed. Also generating means other than variable voltage generators may be employed. No attempt will be made to enumerate all the variations which may be made in the manner of effecting the control of the supply of power to the hoisting motor, or in the control circuits, it being understood that many such variations may be made which do not depart from the spirit and scope of the invention. While described in connection with a car switch controlled elevator, the invention is applicable to other forms of control such for example as those in which the stopping of the car or both starting and stopping of the car are controlled by push buttons in the car for the various landings and at these landings or to systems other than push button controlled in which the slow down and stopping of the car are automatic. Also the invention is applicable to systems without levelling mechanism. Certain features of the invention are applicable to unit voltage source systems or to multi-voltage sources of other than four steps, of other than 60 volt steps, and those in which the voltage increments of the steps are not the same. Many elevator control systems are very complex and admit of many variations. In applying the invention to such control systems variations may be made with a view of adapting the invention more readily to such systems. Therefore it is intended that all matter contained in the above description or shown in the accompanying drawings shall be interpreted as illustrative and not in a limiting sense.

What is claimed is:

1. A control system for a direct current work motor in which a multi-voltage source of direct current is provided for the motor and in which the motor armature is transferred to supply lines of different voltage value in effecting changes in speed of the motor, characterized in that variable voltage direct current generating means is provided for obtaining a gradual change in value of the voltage applied to said motor armature in transferring said motor armature from one voltage to another.

2. A control system for a direct current work motor in which a multi-voltage source of direct current is provided for the motor and in which for effecting change in speed of the motor the motor armature is transferred to multi-voltage supply lines of different voltage value to change the voltage applied to the motor in steps, characterized in that a plurality of direct current generating means are utilized to cause gradually changing voltage to be applied to said motor armature in effecting said transfers.

3. A control system for a direct current work motor in which a multi-voltage source of direct current is provided for the motor and in which the speed of the motor is changed by transferring the motor armature from one voltage to another, characterized in that a direct current generator having a plurality of armature windings is provided, said armature windings being connected in the circuits for said motor armature to act in conjunction with said multi-voltage source to control the value of the voltage applied to said motor armature, and in that means is provided for controlling the voltage of said armature windings so that the change in voltage applied to the motor armature is effected gradually.

4. A control system for a direct current work motor in which a multi-voltage source of direct current of equal voltage increments is provided for the motor and in which the motor armature for acceleration is transferred to multi-voltage supply lines of higher voltage value to increase the voltage applied to the motor in steps, characterized in that a direct current generator having two armature windings is provided, the sum of the full voltages of said generator armature windings being equal to the voltage increment of said supply lines, said motor armature being connected in effecting said transfers to succeeding supply lines of higher voltage values through said generator armature windings alternately and oppositely, and in that means is provided for controlling the voltage of said armature windings so that the increase in voltage applied to the motor armature for each step is effected gradually.

5. A control system for a direct current work motor in which a multi-voltage source of direct current of equal voltage increments is provided for the motor and in which the motor armature for retardation is transferred to multi-voltage supply lines of lower voltage value to decrease the voltage applied to the motor in steps, characterized in that a direct current generator having two armature windings is provided, the sum of the full voltages of said generator armature windings being equal to the voltage increment of said supply lines, said motor armature being connected in effecting said transfers to succeeding supply lines of lower voltage values through said generator armature windings alternately and oppositely, and in that means is provided for controlling the voltage of said armature windings so that the decrease in voltage applied to the motor armature for each step is effected gradually.

6. A control system for a direct current work motor in which the motor armature is adapted to have direct current supplied thereto from a source of several voltage steps of equal voltage increments, one side of the motor armature being connected to one side of the source and the other side of the motor armature being successively transferred to voltage steps of higher voltage value for acceleration and successively transferred to such steps in reverse sequence for retardation, characterized in that a direct current generator having two armature windings is provided, the full voltage of each of which is equal to half said voltage increment, in that said other side of the motor armature is connected to succeeding voltage steps through said generator armature windings alternately and oppositely, and in that means is provided for controlling the voltage of said armature windings so that the change in voltage applied to the motor armature is effected gradually.

7. A control system for a direct current work motor in which the motor armature is adapted to have direct current supplied thereto from a source of several voltage steps of equal voltage increments, one side of the motor armature being connected to one side of the source and the other side of the motor armature being successively transferred to voltage steps of higher voltage value for acceleration and successively transferred to such steps in reverse sequence for retardation, characterized in that a direct current generator having two armature windings is provided, the full voltage of each of which is equal to half said voltage increment, in that said other side of the motor armature is connected to succeeding voltage steps through said generator armature windings alternately and oppositely, and in that means is provided for controlling the generator excitation in effecting the transfer of the motor armature from one voltage step to the next, said means in effecting the transfer acting with the motor armature connected through one of the generator armature windings to one of said voltage steps to cause the generator excitation to be built up before the motor armature is connected through the other generator armature winding to the next step and to be discontinued after the motor armature is disconnected from said one voltage step.

8. A control system for a direct current work motor in which the motor armature is adapted to have direct current supplied thereto from a source of several voltage steps of equal voltage increments, one side of the motor armature being connected to one side of the source and the other side of the motor armature being successively transferred to voltage steps of higher value for acceleration, characterized in that a direct current generator having two armature windings is provided, the full voltage of each of which is equal to half said voltage increment, in that said other side of the motor armature is connected to succeeding voltage steps through said generator armature windings alternately and oppositely, and in that means is provided for controlling the generator excitation in effecting the transfer of the motor armature from one voltage step to the next, said means in effecting the transfer acting with the motor armature connected through one of the generator armature windings to one of said voltage steps to cause the generator excitation to be built up of a polarity to cause the voltage of said one generator armature winding to assist the voltage of said one voltage step to increase the voltage applied to the motor armature half said voltage increment before the motor armature is connected through the other generator armature winding to the next voltage step and to cause the generator excitation to be discontinued after the motor armature is transferred to said next voltage step, said opposite connection of said other generator armature winding causing the voltage of such generator armature winding to oppose that of said next voltage step so that the voltage applied to the motor armature is increased another half voltage increment to that between said one side of said source and said next voltage step as the generator excitation decreases.

9. A control system for a direct current work motor in which the motor armature is adapted to have direct current supplied thereto from a source of several voltage steps of equal voltage increments, one side of the motor armature being connected to one side of the source and the other side of the motor armature being successively transferred to voltage steps of higher voltage value for acceleration, characterized in that a direct current generator having two armature windings is provided, the full voltage of each of which is equal to half said voltage increment, in that said other side of the motor armature is connected to opposite terminals of said generator armature windings and the other terminals of said generator armature windings are alternately connected to successive voltage steps in effecting said transfers, and in that means is provided for controlling the generator excitation in effecting said transfers, said means acting with the motor armature connected through one of said generator armature windings to one of said voltage steps to cause the generator excitation to be built up of a polarity to cause the voltage of said one generator armature winding to assist the voltage of said one voltage step to increase the voltage applied to the motor armature half said voltage increment before the motor armature is connected through the other generator armature winding to the next voltage step, to cause the generator excitation to be discontinued after the motor armature is transferred to said next voltage step, the polarity of connection of said other generator armature winding causing the voltage of such generator armature winding to oppose that of said next voltage step so that the voltage applied to the motor armature is increased another half voltage increment as the generator excitation decreases, to cause the generator excitation to be built up of opposite polarity after said decrease has taken place to increase the voltage applied to the motor armature another half voltage increment before the motor armature is connected through said one generator armature winding to the second next voltage step, and to cause the generator excitation to be discontinued after the motor armature is transferred to the last mentioned voltage step, the polarity of connection of said one generator armature winding causing the voltage of said one generator armature winding to oppose that of said last mentioned voltage step so that the voltage applied to the motor armature is increased another half voltage increment as the generator excitation decreases.

10. A control system for a direct current work motor in which a source of direct current is provided for the motor, characterized in that two direct current generating means are provided, in that means is provided for connecting the motor armature across one of said generating means and for causing excitation of said one generating means to start the motor, and in that means is provided for transferring the motor armature to said source in series with the other generating means with said other generating means excited and opposing said source and for causing said excitation of said other generating means to be discontinued.

11. A control system for a direct current work motor in which a source of direct current is provided for the motor, characterized in that a direct current generator having two armature windings is provided, in that means is provided for connecting one of said generator armature windings across the motor armature and for then connecting the motor armature to said source through the other generator armature winding and disconnecting said one generator armature winding, and in that means is provided for causing the generator excitation to be built up when said one generator armature winding is connected across the motor armature and for causing the generator excitation to be discontinued after said disconnection of said one generator armature winding, the polarity of the connection of said other generator armature winding being such that its voltage is in opposition to that of said source.

12. A control system for a direct current work motor in which a source of direct current is provided for the motor, characterized in that a direct current generator having two armature windings is provided, the sum of the voltages of which is equal to the voltage of said source, in that means is provided for connecting one of said generator armature windings across the motor armature and for causing the generator excitation to be built up to cause the full voltage of said one generator armature winding to be applied to the motor armature, and in that means is provided for then connecting the motor armature to said source through the other generator armature winding with the polarity of the voltage of said other generator armature winding in opposition to that of said source, said first named means thereupon disconnecting said one generator armature winding from said motor armature and causing the generator excitation to be discontinued so that the voltage applied to the motor armature is increased to that of said source.

13. A control system for a direct current work motor in which the motor armature is adapted to receive current from a direct current source, one side of the motor armature being connected to one side of said source, characterized in that a direct current generator having two armature windings is provided, the full voltage of each of which is equal to half the voltage of said source, in that the other side of the motor armature is connected to opposite terminals of said generator armature windings, in that means is provided for connecting the other terminal of one of said generator armature windings to said one side of said motor armature for starting the motor, in that means is provided for causing the generator excitation to be built up to cause the full voltage of said one generator armature winding to be applied to the motor armature, and in that means is provided for then connecting the other terminal of the other generator armature winding to the other side of said source, said first named means thereupon disconnecting said other terminal of said one generator armature winding from said motor armature and said excitation means acting after said disconnection of said one generator armature winding to cause the generator excitation to be discontinued so that the voltage applied to the motor armature is increased to that of said source.

14. A control system for a direct current work motor in which the motor armature is adapted to have direct current supplied thereto from a multi-voltage source of several voltage steps of equal voltage increments, one side of the motor armature being connected to one side of said source and the other side of the motor armature being successively transferred to said voltage steps of higher voltage value for acceleration, characterized in that a direct current generator having two armature windings is provided, the full voltage of each of which is equal to half said voltage increment, in that said other side of the motor armature is connected to opposite terminals of said generator armature windings, in that means is provided for connecting the other terminal of one of said generator armature windings to said one side of said motor armature for starting the motor, in that means is provided for causing the generator excitation to be built up to bring the voltage applied to the motor armature up to half said voltage increment, in that means is provided for connecting said other terminal of the other generator armature winding to the first voltage step and for causing the first named means to disconnect said other terminal of said one generator armature winding from said motor armature, thereby transferring the motor armature to said voltage step, said last named means acting after said disconnection of said one generator armature winding to cause the generator excitation to be discontinued so that the voltage applied to the motor armature is increased another half voltage increment to that of said first voltage step as the generator excitation decreases.

15. A control system for a direct current work motor in which the motor armature is adapted to have direct current supplied thereto from a source of several voltage steps of equal voltage increments, one side of the motor armature being connected to one side of the source and the other side of the motor armature being successively transferred to voltage steps of higher voltage value for acceleration, characterized in that a direct current generator having two armature windings is provided, the full voltage of each of which is equal to half said voltage increment, said other side of the motor armature being connected to opposite terminals of said generator armature windings, in that means is provided for alternately connecting the other terminals of said generator armature windings to successive voltage steps to effect said successive transfers of said other side of said motor armature, in that means is provided for connecting said other terminal of one of said generator armature windings to said one side of said motor armature, in that generator excitation controlling means is provided which is operable with the motor armature connected across said one generator armature winding to cause generator excitation of a polarity to cause the voltage applied to the motor armature for starting the motor of the same polarity as that of the voltage of the source and to cause such excitation to be built up to bring the voltage applied to the motor armature up to half said voltage increment in that means is provided for preventing the connection of said other terminal of the other generator armature winding to said first voltage step until the voltage applied to the motor armature is brought up to said half voltage increment, in that means is provided for causing operation of said means for connecting said other terminal of said one generator armature winding to said one side of the motor armature to break such connection after said connection to said first voltage step is made, and in that means is provided for causing operation of said generator excitation controlling means after said disconnection of said one generator armature winding to cause the generator excitation to be discontinued so that the voltage applied to the motor armature is increased another half voltage increment to that of said first voltage step as the generator excitation decreases.

16. A control system for a direct current work motor in which the motor armature is adapted to have direct current supplied thereto from a source of several voltage steps of equal voltage increments, one side of the motor armature being connected to one side of the source and the other side of the motor armature being successively transferred to voltage steps of higher voltage value for acceleration, characterized in that a direct current generator having two armature windings is provided, the full voltage of each of which is equal to half said voltage increment, said other side of the motor armature being connected to opposite terminals of said generator armature windings, in that means is provided for alternately connecting the other terminals of said generator armature windings to successive voltage steps to effect said successive transfers of said other side of said motor armature, in that means is provided for connecting said other terminal of one of said generator armature windings to said one side of said motor armature, in that means is provided for causing with the motor armature connected across said one generator armature winding generator excitation of a polarity to cause the voltage applied to the motor armature for starting the motor to be of the same polarity as that of the source to cause such excitation to be built up to bring the voltage applied to the motor armature up to half said voltage increment, in that means is provided for preventing the connection of said other terminal of the other generator armature winding to said first voltage step until the voltage applied to the motor armature is brought up to said half voltage increment, in that means is provided for causing operation of said means for connecting said other terminal of said one generator armature winding to said one side of said motor armature to break such connection after said connection to said first voltage step is made, in that means is provided for causing after said disconnection of said one generator armature winding the generator excitation to be discontinued so that the voltage applied to the motor armature is increased another half voltage increment to that of said first voltage step as the generator excitation decreases, in that means is provided for causing said generator excitation to be built up of opposite polarity after said decrease has taken place to increase the voltage applied to the motor armature another half voltage increment, in that means is provided for preventing the connection of said other terminal of said one generator armature winding to said second voltage step until the voltage applied to said motor armature is increased such last mentioned half voltage increment, in that means is provided for causing operation of said means for connecting said other terminal of said other generator armature winding to said first voltage step to break such connection after said connection to said second voltage step is made, and in that means is provided for causing after said disconnection of said other generator armature winding the generator excitation to be discontinued so that the voltage applied to the motor armature is increased another half voltage increment to that of the first and second voltage steps as the generator excitation decreases.

17. A control system for a direct current work motor in which the motor armature is adapted to have direct current supplied thereto from a source of several voltage steps of equal voltage increments, one side of the motor armature being connected to one side of the source and the other side of the motor armature being successively transferred to voltage steps of lower voltage value for retardation, characterized in that a direct current generator having two armature windings is provided, the full voltage of each of which is equal to half said voltage increment, said other side of the motor armature being connected in effecting said transfers to succeeding voltage steps of lower voltage value through said generator armature windings alternately and oppositely, in that means is provided for causing with the motor armature connected through one of said generator armature windings to one of said voltage steps the generator excitation to be built up of a polarity to cause the voltage of such one generator armature winding to oppose the voltage of such voltage step to decrease the voltage applied to the motor armature half said voltage increment, in that means is provided for preventing the connection of said other side of the motor armature through the other generator armature winding to the next lower voltage step until the voltage applied to the motor armature is decreased said half voltage increment, and in that means is provided for causing the generator excitation to be discontinued after the motor armature is transferred to said next lower voltage step, said opposite connection of said other generator armature winding causing the voltage of said other generator armature winding to assist that of said next voltage step so that the voltage applied to the motor armature is decreased another half voltage increment to that across said one side of the source and said next lower voltage step as the generator excitation decreases.

18. A control system for a direct current work motor in which the motor armature is adapted to have direct current supplied thereto from a source of several voltage steps of equal voltage increments, one side of the motor armature being connected to one side of the source and the other side of the motor armature being successively transferred to voltage steps of lower voltage value for retardation, characterized in that a direct current generator having two armature windings is provided, the full voltage of each of which is equal to half said voltage increment, said other side of the motor armature being connected in effecting said transfers to succeeding voltage steps of lower voltage value through said generator armature windings alternately and oppositely, in that means is provided for causing with the motor armature connected through one of the generator armature windings to one of said voltage steps the generator excitation to be built up of a polarity to cause the voltage of said one generator armature winding to oppose the voltage of said one voltage step to decrease the voltage applied to the motor armature half said voltage increment, in that means is provided for preventing the connection of said other side of the motor armature through the other generator armature winding to the next lower voltage step until the voltage applied to the motor armature is decreased said half voltage increment, in that means is provided for causing the generator excitation to be discontinued after the motor armature is transferred to said next lower voltage step, said opposite connection of said other generator armature winding causing the voltage of such generator armature winding to assist that of said next voltage step so that the voltage applied to the motor armature is decreased another half voltage increment to that across said one side of the source and said next voltage step as the generator excitation decreases, in that means is provided for causing the generator excitation to be built up of opposite polarity after said decrease has taken place to decrease the voltage applied to the motor armature another half voltage increment, in that means is provided for preventing the connection of the motor armature through said one generator armature winding to the second next lower voltage step until the voltage applied to the motor armature is decreased such last mentioned half voltage increment, and in that means is provided for causing the generator excitation to be discontinued after the motor armature is transferred to the last mentioned voltage step, the polarity of connection of said one generator armature winding causing the voltage of said one generator armature winding to assist that of said last mentioned voltage step so that the voltage applied to the motor armature is decreased another half voltage increment to that across said one side of said source and said last mentioned voltage step as the generator excitation decreases.

19. A control system for a direct current work motor in which a source of direct current is provided for the motor, characterized in that two direct current generating means are provided, in that means is provided for connecting the motor armature through one of said generating means to said source and for causing the voltage of said one generating means to be built up in opposition to the voltage of said source to decrease the voltage applied to the motor armature, and in that means is provided for transferring the motor armature to across said other generating means with the voltage thereof built up and of the same polarity as that of the voltage of said source and for causing the voltage of said other generating means to be decreased.

20. A control system for a direct current work motor in which a source of direct current is provided for the motor, characterized in that a direct current generator having two armature windings is provided, the sum of the full voltages of which is equal to the voltage of said source, in that means is provided for connecting the motor armature through one of said generator armature windings to said source, in that means is provided for causing, with the motor armature so connected, the generator excitation to be built up of a polarity to cause the voltage of said one generator armature winding to oppose the voltage of said source to decrease the voltage applied to the motor armature, and in that means is provided for connecting the motor armature across said other generator armature winding after such decrease has taken place and for breaking said connection to said source, said excitation controlling means acting to discontinue the excitation of the generator after the motor armature is transferred to across said other generator armature winding.

21. A control system for a direct current work motor in which the motor armature is adapted to have direct current supplied theeto from a multi-voltage source of several voltage steps of equal voltage increments, the motor armature being successively transferred to voltage steps of lower voltage value for retardation, characterized in that a direct current generator having two armature windings is provided, the sum of the full voltages of which is equal to said voltage increment, the motor being connected in effecting said transfers to succeeding voltage steps through said generator armature windings alternately, in that means is provided for controlling the generator excitation, said means being operable with the motor armature connected through one of said generator armature windings to the first of said voltage steps to cause the generator excitation to be built up of a polarity to cause the voltage of said one generator armature winding to oppose the voltage of said first voltage step to decrease the voltage applied to the motor armature, and in that means is provided for connecting the motor armature across said other generator armature winding after such decrease has taken place and for disconnecting it from said first voltage step, said excitation controlling means being operable to cause the excitation of the generator to be discontinued after the motor armature is transferred to across said other generator armature winding.

22. A control system for a direct current work motor in which the motor armature is adapted to have direct current supplied thereto form a source of several voltage steps of equal voltage increments, one side of the motor armature being connected to one side of the source and the other side of the motor armature being successively transferred to voltage steps of lower voltage value for retardation, characterized in that a direct current generator having two armature windings is provided, the full voltage of each of which is equal to half said voltage increment, the connection of said other side of the motor armature being to opposite terminals of said generator armature windings, in that means is provided for alternately connecting the other terminals of said generator armature windings to succeeding voltage steps of lower voltage value in effecting said transfers, in that means is provided for controlling the generator excitation in effecting said transfers which is operable with the other terminal of one of said generator armature windings connected to the first of said voltage steps, thus connecting the motor armature to that step through said one generator armature winding, to cause the generator excitation to be built up of a polarity to cause the voltage of said one generator armature winding to oppose the voltage of the first voltage step to decrease the voltage applied to the motor armature half said voltage increment, and in that means is provided for connecting the other terminal of said other generator armature winding to said one side of the motor armature after such decrease has taken place and for causing operation of said means for connecting the other terminals of said generator armature windings to disconnect said other terminal of said one generator armature winding from the first voltage step, said generator excitation controlling means being operable to discontinue the excitation of the generator after the motor armature is transferred to across said other generator armature winding.

23. A control system for a direct current work motor in which the motor armature is adapted to have direct current supplied thereto from a source of several voltage steps of equal voltage increments, one side of the motor armature being connected to one side of the source and the other side of the motor armature being successively transferred to voltage steps of lower voltage value for retardation, characterized in that a direct current generator having two armature windings is provided, the full voltage of each of which is equal to half said voltage increment, in that the connection of said other side of the motor armature is to opposite terminals of said generator armature windings and the other terminals of said generator armature windings are alternately connected to successive voltage steps in effecting said transfers, in that means is provided for controlling the generator excitation in effecting said transfers, said means acting with the motor armature connected through one of said generator armature windings to the second of said voltage steps to cause the generator excitation to be built up of a polarity to cause the voltage of said one generator armature winding to oppose the voltage of the second voltage step to decrease the voltage applied to the motor armature half said voltage increment before said other side of the motor armature is connected through the other generator armature winding to the first voltage step and to be discontinued after the motor armature is transferred to the first voltage step, said opposite connection of the other generator armature winding causing the voltage of said other generator armature winding to assist that of said first voltage step so that the voltage applied to the motor armature is decreased another half voltage increment to that of the first voltage step as the generator excitation decreases, and to be built up of opposite polarity after said decrease has taken place to decrease the voltage applied to the motor armature another half voltage increment, in that means is provided for connecting said other terminal of said one generator armature winding to said one side of the motor armature after such decrease has taken place, and in that said other terminal of said other generator armature winding is then disconnected from the first voltage step, said excitation controlling means acting to discontinue the excitation of the generator after the motor armature is transferred to said one generator armature winding.

24. A control system for a direct current hoisting motor for an elevator car in which a multi-voltage source of direct current is provided for the motor, in which the motor armature is transferred to multi-voltage supply lines of different voltage value in effecting change in speed of the motor, and in which levelling mechanism is provided for causing the car to be brought to a landing level in stopping, characterized in that a direct current generator is provided for controlling the change in value of the voltage applied to said motor armature in effecting the transfer to different supply lines and for applying voltage independently of the supply lines to the motor armature for the levelling operation.

25. A control system for a direct current hoisting motor for an elevator car in which the motor armature is adapted to have direct current supplied thereto from a multi-voltage source, the motor armature being successively transferred to supply lines of lower voltage value for retardation, and in which levelling mechanism is provided for causing the car to be brought to a landing level in stopping, characterized in that a direct current generator is utilized to cause a gradual change in the voltage applied to the motor armature as the motor armature is connected to succeeding supply lines of lower voltage value and to supply current to the motor armature for the levelling operation.

26. A control system for a direct current hoisting motor for an elevator car in which a multi-voltage source of direct current is provided for the motor, in which for the main operation the direction of car travel is controlled by reversing switches in the motor armature circuit and the motor armature is transferred to multi-voltage supply lines of different voltage value in effecting change in speed of the motor, and in which levelling mechanism is provided for causing the car to be brought to a landing level in stopping, characterized in that direct current generating means is provided, in that means is provided for connecting said generating means to act in conjunction with said supply lines to apply voltage to the motor armature in effecting said transfers and for connecting said generating means to apply voltage independently of the supply lines to the motor armature for the levelling operation, in that means is provided for controlling the voltage of said generating means to cause a gradual change in the voltage applied to the motor armature in effecting said transfers to different supply lines, and in that means is provided for maintaining the operated reversing switch in operated condition for the levelling operation and for controlling the direction of car travel by controlling the polarity of the generator.

27. A control system for a direct current hoisting motor for an elevator car in which a multi-voltage source of direct current is provided for the motor, in which the motor armature for acceleration is transferred to multi-voltage supply lines of higher voltage value to increase the voltage applied to said motor in steps and for retardation is transferred to multi-voltage supply lines of lower voltage value to decrease the voltage applied to said motor in steps, and in which levelling mechanism is provided for causing the car to be brought to a landing level in stopping, characterized in that direct current generating means is provided, in that means is provided for connecting said generating means to act in conjunction with said supply lines to apply voltage to the motor armature in effecting said transfers and for connecting said generating means to apply voltage independently of the supply lines to the motor armature for the levelling operation, and in that means is provided for controlling the voltage of said generating means to cause a gradual change in the voltage applied to the motor armature in effecting said transfers.

28. A control system for a direct current hoisting motor for an elevator car in which a multi-voltage source of direct current is provided for the motor, in which the motor armature for acceleration is transferred to multi-voltage supply lines of higher voltage value to increase the voltage applied to said motor in steps and for retardation is transferred to multi-voltage supply lines of lower voltage value to decrease the voltage applied to said motor in steps, and in which levelling mechanism is provided for causing the car to be brought to a landing level in stopping, characterized in that two direct current generating means are provided, in that means is provided for connecting said generating means to act in conjunction with said supply lines to apply voltage to the motor armature in effecting said transfers, in that means is provided for controlling the voltage of said generating means to cause a gradual change in the value of voltage applied to said motor armature in effecting said transfers, in that means is provided for connecting one of said generating means to apply voltage independently of the supply lines to the motor armature for the levelling operation, and in that means is provided which is responsive to said levelling mechanism in case the car overruns or underruns a landing in stopping to cause the voltage applied to said motor armature by said one generating means to be of proper polarity for bringing the car to the landing level.

29. A control system for a direct current hoisting motor for an elevator car in which a multi-voltage source of direct current is provided for the motor, in which the motor armature for acceleration is transferred to multi-voltage supply lines of higher voltage value to increase the voltage applied to said motor in steps and for retardation is transferred to multi-voltage supply lines of lower voltage value to decrease the voltage applied to said motor in steps, and in which levelling mechanism is provided for causing the car to be brought to a landing level in stopping, characterized in that a direct current generator having two armature windings is provided, the motor armature being connected to succeeding supply lines through said generator armature windings alternately, in that means is provided for controlling the voltage of the generator armature windings to cause the change in voltage applied to the motor armature to be effected gradually, in that means is provided for connecting the motor armature across one of said generator armature windings independently of the supply lines for the levelling operation, and in that means is provided which is responsive to said levelling mechanism in case the car overruns or underruns a landing in stopping to control the polarity of excitation of said generator to cause the voltage applied to said motor armature by said one generator armature winding to be of proper polarity for bringing the car to the landing level.

30. A control system for a direct current hoisting motor for an elevator car in which the motor armature is adapted to have direct current supplied thereto from a multi-voltage source of equal voltage increments, the motor armature being successively transferred to supply lines of lower voltage value for retardation, and in which levelling mechanism is provided for causing the car to be brought to a landing level in stopping, characterized in that a direct current generator is provided having two armature windings, the full voltage of each of which is equal to half said voltage increment, the connection of the motor armature to succeeding supply lines of lower voltage value being through said generator armature windings alternately and oppositely, in that means is provided for transferring the motor armature from the supply line of lowest voltage value to across one of the generator armature windings for slow speed operation, and in that means is provided which, with the motor armature connected across said one generator armature winding, is responsive to said levelling mechanism in case the car underruns or overruns a landing in stopping to cause excitation of said generator to bring the car to the landing level.

31. A control system for a direct current hoisting motor for an elevator car in which the motor armature is adapted to have direct current supplied thereto from a source of several voltage steps of equal voltage increments, one side of the motor armature being connected to one side of the source and the other side of the motor armature being successively transferred to voltage steps of higher voltage value for acceleration and successively transferred to such steps in reverse sequence for retardation, and in which levelling mechanism is provided for causing the car to be brought to a landing level in stopping, characterized in that a direct current generator is provided having two armature windings, the full voltage of each of which is equal to half said voltage increment, said other side of the motor armature being connected in effecting said transfers to succeeding voltage steps through said generator armature windings alternately and oppositely, in that means is provided for connecting the motor armature across a certain one of said generator armature windings independently of the source for starting the car, for slow speed operation prior to stopping the car and for levelling, in that means is provided for causing, with the motor armature connected across said certain armature winding for starting the car or through a generator armature winding to one of the voltage steps during acceleration or retardation, the generator to be excited to build up the voltage of each generator armature winding to alter the voltage applied to the motor armature half said voltage increment, in that means is provided for preventing the next connection of the motor armature until the voltage applied to the motor armature is altered said half voltage increment, in that means is provided for causing the generator excitation to be discontinued after the first connection of the motor armature is broken to decrease the voltage of each generator armature winding to again alter the voltage applied to the motor armature half said voltage increment, in that means is provided which is responsive to said levelling mechanism in case the car underruns a landing in stopping to maintain the excitation of said generator of the same polarity as for said slow speed operation prior to levelling and in case of an overrun to reverse the polarity of excitation of the generator, and in that means is provided for reducing the excitation of the generator for the levelling operation.

DAVID LEONARD LINDQUIST.
JACOB DANIEL LEWIS.